(12) United States Patent
Yetukuri et al.

(10) Patent No.: US 7,152,928 B2
(45) Date of Patent: Dec. 26, 2006

(54) HEAD RESTRAINT ASSEMBLY FOR A VEHICLE SEAT ASSEMBLY

(75) Inventors: Nagarjun Yetukuri, Rochester Hills, MI (US); Mladen Humer, Eastpointe, MI (US); Kar K. Low, Southfield, MI (US)

(73) Assignee: Lear Corporation, Southfield, MI (US)

( * ) Notice: Subject to any disclaimer, the term of this patent is extended or adjusted under 35 U.S.C. 154(b) by 1 day.

(21) Appl. No.: 11/110,549

(22) Filed: Apr. 20, 2005

(65) Prior Publication Data
US 2006/0238010 A1    Oct. 26, 2006

(51) Int. Cl.
*B60R 22/28* (2006.01)
*B60N 2/42* (2006.01)

(52) U.S. Cl. .................. 297/410; 297/216.12
(58) Field of Classification Search ............. 297/391, 297/410, 216.12
See application file for complete search history.

(56) References Cited

U.S. PATENT DOCUMENTS

| | | | | |
|---|---|---|---|---|
| 3,603,642 A | | 9/1971 | Laessker ............. 297/408 |
| 3,650,561 A | * | 3/1972 | Faust et al. .......... 297/391 |
| 3,655,241 A | | 4/1972 | Herzer et al. ......... 297/408 |
| 4,123,104 A | | 10/1978 | Andres et al. ........ 297/391 |
| 4,190,291 A | | 2/1980 | Korger ................ 297/408 |
| 4,191,422 A | | 3/1980 | Inasawa et al. ...... 297/391 |
| 4,304,439 A | | 12/1981 | Terada et al. ........ 297/409 |
| 4,600,240 A | | 7/1986 | Suman et al. ........ 297/408 |
| 4,657,304 A | | 4/1987 | Heesch et al. ....... 297/391 |
| 4,682,817 A | | 7/1987 | Freber ................ 297/408 |
| 4,685,737 A | | 8/1987 | Deley et al. ......... 297/408 |
| 4,762,367 A | | 8/1988 | Denton .............. 297/409 |
| 4,834,456 A | | 5/1989 | Barros et al. ........ 297/403 |
| 4,861,107 A | | 8/1989 | Vidwans et al. ...... 297/408 |
| 5,145,233 A | | 9/1992 | Nagashima .......... 297/408 |
| 5,199,765 A | | 4/1993 | Garmendia et al. ... 297/391 |
| 5,660,441 A | * | 8/1997 | Nagayasu et al. .... 297/408 |
| 5,860,703 A | * | 1/1999 | Courtois et al. ...... 297/410 |
| 6,000,760 A | | 12/1999 | Chung ............... 297/408 |
| 6,007,154 A | | 12/1999 | Parker et al. ........ 297/410 |
| 6,062,644 A | | 5/2000 | Lance ................ 297/410 |
| 6,062,645 A | * | 5/2000 | Russell .............. 297/410 |
| 6,068,338 A | * | 5/2000 | Takei et al. .......... 297/391 |
| 6,471,296 B1 | | 10/2002 | Lance ................ 297/410 |
| 6,499,805 B1 | * | 12/2002 | Watadani ........... 297/408 |
| 6,533,359 B1 | | 3/2003 | Holstensson ........ 297/391 |
| 6,719,373 B1 | | 4/2004 | Zimmermann ...... 297/410 |
| 6,899,395 B1 | * | 5/2005 | Yetukuri et al. ...... 297/408 |
| 6,983,995 B1 | * | 1/2006 | Veine et al. ......... 297/391 |

(Continued)

FOREIGN PATENT DOCUMENTS

DE    3338023 A1 *   4/1985

(Continued)

*Primary Examiner*—Peter M. Cuomo
*Assistant Examiner*—Sarah B. McPartlin
(74) *Attorney, Agent, or Firm*—Bill Panagos

(57) ABSTRACT

A head restraint assembly for a vehicle seat assembly including a post to operatively engage a vehicle seat and provide vertical movement relative thereto. The post includes a control leg, a slave leg and a contoured cross member disposed therebetween. Each of the legs has a terminal end and an offset disposed between the terminal end and the contoured cross member. The head restraint assembly further includes a bun attached to the post. The offsets advance a portion of the post and the contoured cross member toward a seat occupant to facilitate placement of a predetermined portion of the bun relative thereto and substantially reduce head displacement during a rear end vehicular collision.

12 Claims, 1 Drawing Sheet

U.S. PATENT DOCUMENTS

| | | | |
|---|---|---|---|
| 2001/0028191 A1 | 10/2001 | Lance | 297/410 |
| 2003/0020314 A1 | 1/2003 | Mauro et al. | 297/410 |
| 2005/0001463 A1 | 1/2005 | Yetukuri et al. | 297/391 |

FOREIGN PATENT DOCUMENTS

| | | |
|---|---|---|
| EP | 0 352 234 | 1/1990 |
| EP | 1 046 541 | 10/2000 |
| GB | 2161702 | 1/1986 |
| GB | 2 240 920 | 8/1991 |
| GB | 2 319 468 | 5/1998 |
| JP | 5-329032 | 12/1993 |
| JP | 09048272 | 2/1997 |
| JP | 2000060678 | 8/1998 |

\* cited by examiner

HEAD RESTRAINT ASSEMBLY FOR A VEHICLE SEAT ASSEMBLY

BACKGROUND OF THE INVENTION

1. Field of the Invention

The present invention relates, generally, to a head restraint assembly, and more specifically to a head restraint assembly having a contoured and offset post for a vehicle seat assembly.

2. Description of the Related Art

Conventional vehicle seat designs of the type commonly found in the related art typically include a seatback assembly, a lower seat assembly, recliner mechanism, manual or power adjustment mechanism for adjusting a number of positions of either the seatback or lower seat assemblies, as well as a number of safety features including occupant restraint devices such as seatbelts.

In the context of vehicle seating design, there is an ongoing effort to provide safety mechanisms that reduce the chance of injury to the passenger's head and neck region. For instance, in the event of a rear end vehicular collision, the occupant's torso is forced against the seatback, and the occupant's neck and head region moves relative to the torso, causing a relative angular displacement between the chest and neck and head region of the occupant. Depending on the force of the rear end collision, this angular displacement can be quickly closed by movement of the neck and head region of the passenger toward the head restraint in an event commonly known as "whiplash." Various head restraint assemblies have been included in vehicle seats to reduce whiplash.

One of the most common ways to reduce whiplash is to minimize the distance between the back of the passenger's head and neck region and the head restraint, thereby reducing the movement of the passenger's head and neck region relative to the torso. The distance between the passenger's head and the head restraint is commonly known as "backset" and the movement of the passenger's head relative to the torso is commonly known as "head displacement." In an effort to minimize backset and reduce head displacement vehicle seats often include an adjustable head restraint.

One type of adjustable head restraint assembly employed within vehicle seats can be adjusted vertically, relative to the seat back. Typically, this type of head restraint includes a post, which often resembles an inverted U, and a foam body surrounding a portion of the post. However, this type of head restraint is only capable of vertical movement typically along the same plane as the seat back, which may actually increase the backset when the seat back is even slightly reclined. Additionally, given the typical inverted U-shape of a standard post, the cross member may do little to stop head displacement. For example, during a rear end vehicular collision, the passenger's head may actually move under the cross member, thereby increasing head displacement and the severity of whiplash.

Another type of head restraint employed with vehicle seats is commonly referred to as a "4-way" head restraint. 4-way head restraints provide not only vertical movement as described above, but also tilt or fore/aft movement relative to the passenger's head and neck region in an effort to minimize backset and reduce head displacement. However, this type of head restraint requires complex mechanisms to provide the 4-way movement and is typically found only in higher end vehicles. Additionally, some 4-way head restraints employ the standard inverted U-shape post, which includes certain disadvantages with respect to reducing head displacement in the event of a rear end vehicular collision as discussed above.

Although the adjustable head restraints of the type generally known in the related art have worked well for their intended purposes certain disadvantages remain. Specifically, there remains a need for a head restraint assembly that reduces head displacement to during a vehicular collision. Furthermore, there remains a need for a head restraint assembly that maintains a substantially constant backset while providing vertical adjustment relative to the seat back. Further still, there remains a need for a head restraint assembly that minimizes backset and head displacement to reduce the likelihood of whiplash during a rear end vehicular collision. Further still, there remains a need for a head restraint assembly that minimizes backset and reduces head displacement that is also cost-effective to manufacture, easy to install, and suitable for use within all vehicle models.

SUMMARY OF THE INVENTION

The disadvantages of the related art are overcome in a head restraint assembly that includes a post adapted to operatively engage a vehicle seat and provide vertical movement relative thereto. The post includes a control leg, a slave leg and a contoured cross member disposed therebetween. Each of the legs has a terminal end and an offset disposed between the terminal end and the contoured cross member. The head restraint assembly further includes a bun operatively attached to the post. The offsets advance a portion of the legs and the contoured cross member toward a seat occupant to facilitate placement of a predetermined portion of the bun relative thereto and substantially reduce head displacement during a rear end vehicular collision.

Accordingly, one advantage of the present invention is that it provides an offset post that minimizes backset to reduce the likelihood of whiplash.

Another advantage of the present invention is that it provides an offset post that advances the cross member and a portion of the legs toward a seat occupant to facilitate placement of a predetermined portion of the bun to minimize head displacement.

Yet advantage of the present invention is that it provides an offset post to maintain a substantially constant backset while providing vertical adjustment relative to the seat back.

Still another advantage of the present invention is that it provides a contoured post to increase the surface area of the cross member within the bun to reduce head displacement during a rear end vehicular collision.

Still another advantage of the present invention is that it provides a post having a contoured cross member to increase strength and resist forces induced during a rear end vehicular collision to reduce head displacement.

Still another advantage of the present invention is that it minimizes backset and reduces head displacement while being cost-effective to manufacture, easy to install, and suitable for use within all vehicle models.

Other advantages of the invention will be readily appreciated as the same becomes better understood by reference to the following detailed description when considered in connection with the accompanying drawings.

DETAILED DESCRIPTION OF THE PREFERRED EMBODIMENT(S)

Figure 1:
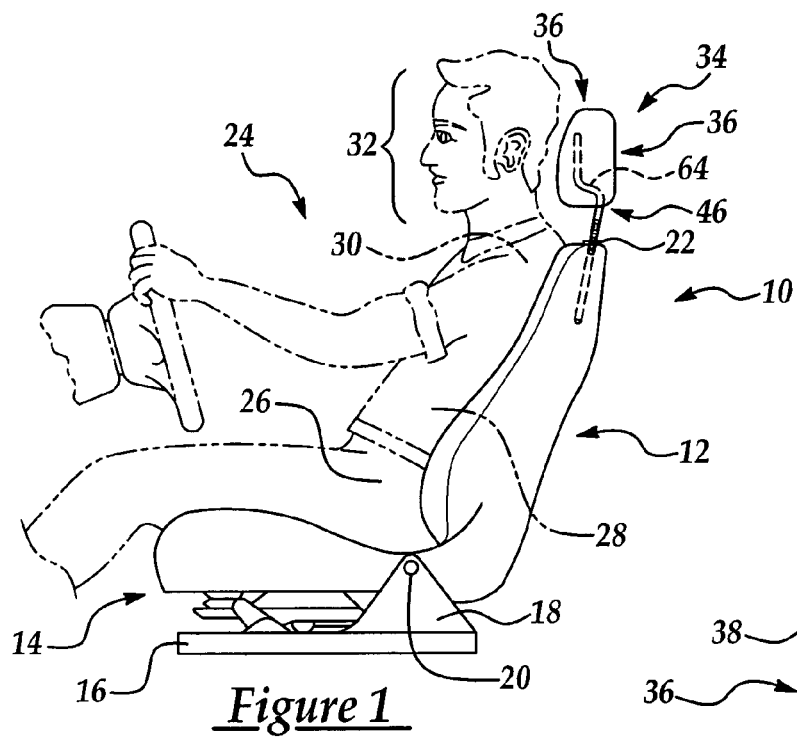
FIG. 1 is an elevational side view of a head restraint assembly and vehicle seat assembly of the present invention illustrated in relation to a seat occupant shown in phantom.

Referring now to the drawings, where like numerals are used to designate like structure throughout the Figures, a vehicle seat assembly of the present invention is generally indicated at 10 in FIG. 1. The vehicle seat assembly 10 includes a seatback, generally indicated at 12, and a lower seat assembly, generally indicated at 14, that is supported on a seat track mechanism 16, as is commonly known in the art. The seatback 12 may be pivotally connected to the lower seat assembly 14 by means of a bracket 18 via pivot point 20 that is connected to the seat track mechanism 16. In this way, the vehicle seat assembly 10 may be adapted to recline or adjust in a number of ways that are commonly known in the art. The seat back 12 further includes a locking mechanism 22 to releasably engage a portion of the head restraint assembly, described in greater detail below. In addition to these common elements, the seat assembly 10 may include various controls and restraint systems, such as seatbelts, etc. that are not shown, but that are well known in the art.

An occupant, generally indicated at 24, is shown in phantom seated upon the vehicle seat assembly 10. The occupant 24 has a pelvic area 26, which is proximate to both the lower seat assembly 14 and to the lower end of the seatback 12. The occupant 24 also has a lumbar area 28 supported above the pelvic area 26, and a shoulder or thoracic area 30 supported above the lumbar area 28. Furthermore, the occupant 24 has a head and neck area 32 supported above the thoracic area 30.

Referring to FIG. 1, the vehicle seat assembly 10 also includes a head restraint assembly of the present invention, generally indicated at 34. The head restraint assembly is operatively supported by the seatback 12 and corresponds to the neck and head area 32 of the occupant 24. As shown, the head restraint assembly 34 is employed for use in connection with the driver's seat 10. However, those having ordinary skill in the art will appreciate that the head restraint assembly 34 of the present invention may be adapted for use in connection with a vehicle seat assembly 10 located anywhere within a vehicle.

The head restraint assembly 34 includes a post, to be described, and a bun, generally indicated at 36, operatively attached to the post. The bun 36 includes a foam core 38 and a coverstock 40. The foam core 38 provides a cushioned yet resilient soft-touch feature to the head restraint assembly 34. In the event of a rear end vehicular collision, the foam core 38 receives the head and neck area 32 of the seat occupant 24 and absorbs energy from the head displacement to dampen contact with the head restraint assembly 32 and reduce the severity of whiplash. To this end, the foam core 38 includes a predetermined thickness from the center of the bun 36 to the coverstock 40 proximate to the head and neck area 32 of the seat occupant 24. Those having ordinary skill in the art will appreciate that the predetermined thickness of the foam core 38 will depend on multiple factors such as the density and indentation load deflection ("ILD") of the material employed to serve as the foam core 38 as well as the intended application of the head restraint assembly 34. By way of example, the material employed to serve as the foam core 38 may include polyurethane, polypropylene or other foams having an appropriate ILD for the intended application and the predetermined thickness ranges from 35 to 60 millimeters. Furthermore, in order to maintain a uniform feel within the vehicle seat 10, the foam core 38 may be constructed from the same material as that found within the seat back 12 or lower seat assembly 14.

The coverstock 40 is adapted to conceal the foam core 38 for improved aesthetics of the vehicle interior. Accordingly, the coverstock 40 includes a class-A surface 42 that is visible from the interior of a vehicle and a class-B surface 44 that contacts the foam core 38. As discussed above with respect to the foam core 38, the coverstock 40 employed for the head restraint assembly 34 may be the same as that employed for use in the vehicle seat 10. Furthermore, the coverstock 40 employed for use in connection with the head restraint assembly 34 may be constructed from any number of materials. By way of example, the coverstock 40 may be leather, vinyl, cloth, or polymer, such as polyvinyl, polyvinyl chloride (PVC), thermoplastic olefin (TPO) or thermoplastic urethane (TPU). As is common in the art, the type of material employed for use as the coverstock 40 will typically depend on the overall price point for the vehicle. Those having ordinary skill in the art will appreciate that while the head restraint assembly 34 of the present invention includes a foam core 38 and a coverstock 40, a head restraint assembly 34 may include a self-skinning foam core, thereby eliminating the need for a coverstock 40.

Figure 2:
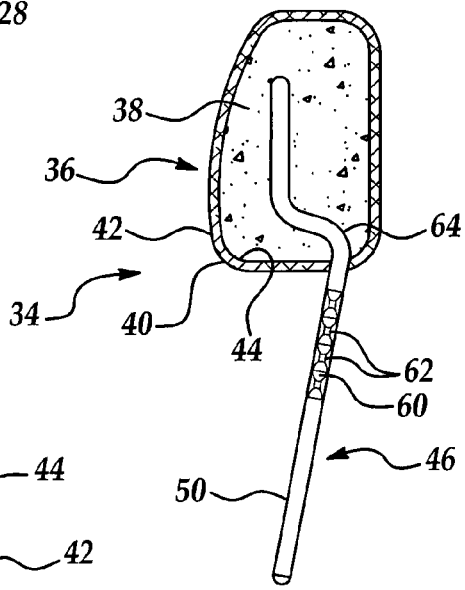
FIG. 2 is a side cross-sectional view of the head restraint assembly of the present invention.
Figure 3:
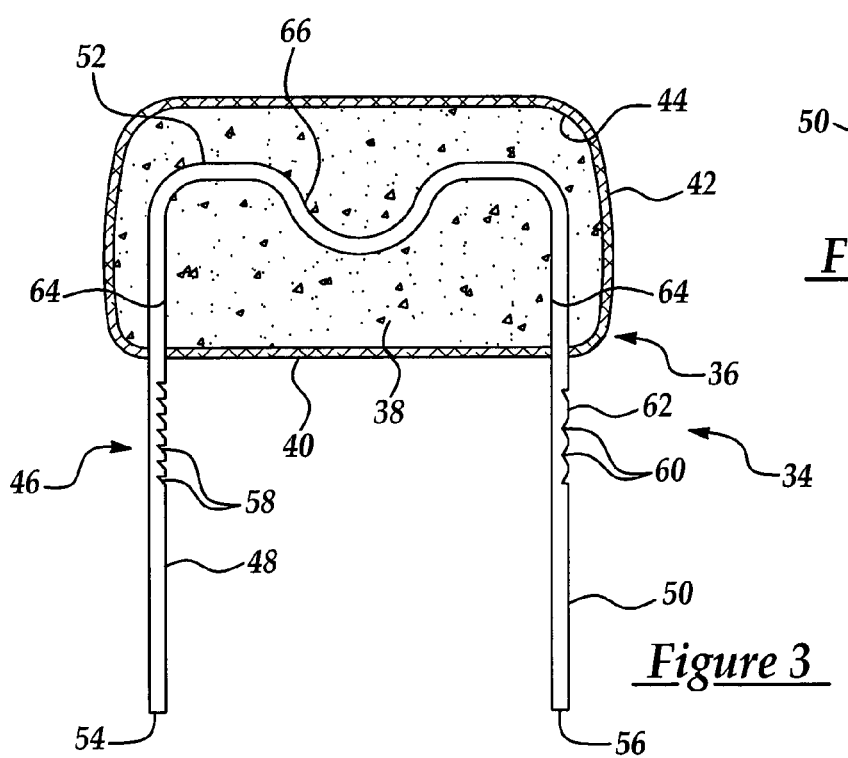
FIG. 3 is a front cross-sectional view of the head restraint assembly of the present invention.

With continuing reference to FIGS. 1–3, the head restraint assembly 34 further includes a post, generally indicated at 46. The post 46 is operatively supported by the seat back 12 and is adapted to provide vertical movement of the bun relative to the seat back 12. The post 46 includes a control leg 48, slave leg 50 and a cross member 52 disposed therebetween. As shown in the Figures, the bun 36 conceals the cross member 52 and a portion of the control leg 48 and slave leg 50. Specifically, the foam core 38 substantially surrounds the cross member 52 and a portion of each leg 48, 50 to prevent direct contact with the head and neck area 32 of the seat occupant 24 during a rear end vehicular collision. The post 46 is constructed from a metal material such as steel or alloy having suitable strength to resist forces that may be imposed thereon in the event of a rear end vehicular collision. However, those having ordinary skill in the art will appreciate that other material such as a polymer having suitable characteristics for the intended application may also be employed.

As shown in FIG. 2, the control leg 48 and the slave leg 50 each include a terminal end 54, 56, respectively. Upon installation to a vehicle seat 10, the terminal end 54, 56 of each leg 48, 50 is operatively received within the seat back 12. The control leg 48 includes a plurality of aligned notches 58 in spaced relation relative to each other to define a predetermined number of vertical adjustment positions relative to the seat back 12. The notches 58 are adapted to operatively engage a portion of the locking mechanism 22 to maintain the head restraint assembly 34 in a fixed position relative to the seat back 12. The notches 58 are disposed on the control leg 48 adjacent the terminal end 54 to facilitate vertical adjustment of the bun 36 relative to the seat back 12. Specifically, the notches 58 to provide a "slide-over" feature that enables a seat occupant 24 to freely move the head restraint assembly 34 between adjustment positions in the upward direction, away from the seatback 12. However, when attempting to vertically adjust the head restraint assembly 34 downwardly, toward the seat back 12, the notches provide releasable locking movement between adjustment positions, which may be manually unlocked by the seat occupant 24 operating the locking mechanism 22.

However, those having ordinary skill in the art will appreciate that the notches 58 may also be disposed between the offset, described in greater detail below, and the cross member 52 where a locking mechanism 22 is employed within the head restraint assembly 34 to accomplish the same end.

The slave leg 50 further includes a plurality of aligned detents 60 in spaced relation to each other. Unlike the notches 58 of the control leg 48, the detents 60 provide slide-over in both directions of vertical adjustment relative to the seat back 12. To facilitate the slide-over feature, each of the detents 60 are joined by a bridge 62 to enable efficient movement of the slave leg during vertical adjustment by the control leg. The detents 60 are adapted to provide lateral support of the bun 36 at each of the predetermined vertical adjustment positions defined by the notches 58 along the control leg 48. Specifically, the detents 62 provide an increased contact surface area to be engaged by the locking mechanism 22, which increases tension and frictional force to further prevent involuntary downward movement of the head restraint assembly 36 in the event of a rear end vehicular collision.

Both the control leg 48 and the slave leg 50 include an offset 64 that advances the proximate distance of the cross member 52 toward the passenger's head and neck area 32. Advancing the cross member 52 toward the passenger's head and neck area 32 reduces the likelihood that the head will rotate under the cross member 52 during a rear end vehicular collision. Additionally, the offset 64 provides for overall advancement of the bun 36 toward the passenger's head and neck area 32, thereby minimizing backset. Furthermore, the offset 64 facilitates placement of a predetermined portion of the bun 36 in front of the post 46 to minimize travel of the seat occupant's head 32, thus reducing displacement between the head 32 and thoracic area 30. The predetermined portion would include an optimal amount of foam 38 to cushion the seat occupant's head 32 yet maintain proper backset, which will vary upon the style of the seat back 12 and the intended application. Finally, the offset 64 minimizes the tendency to increase backset as the head restraint assembly 34 is adjusted vertically, away from the seat back 12. This is especially true where vertical adjustment occurs within the head restraint assembly 34 rather than at the seat back 12, which would provide for only a slight variation in backset, if any, between vertical adjustment positions. In the embodiment illustrated in FIGS. 1–3, the offset is 45 mm±10 mm. However, those having ordinary skill in the art will appreciate that the offset 64 may vary depending on the style of the vehicle seat 10 and its intended application.

As shown in FIG. 3, the cross member 52 includes contoured shape to substantially reduce head displacement during a rear end vehicular collision. Specifically, the cross member includes a sinusoidal contour 66 to increase the surface area of the cross member 52 within the bun 36, thereby reducing the likelihood of the seat occupant's head moving under the cross member 52 upon impact. Furthermore, the contour 66 increases strength and stiffness of the cross member 52 to reduce the likelihood of failure due to receipt of sheer forces imposed during a rear end vehicular collision. Those having ordinary skill in the art will appreciate that while the sinusoidal contour 66 of the present invention is substantially "M" shaped, any contour may be employed to accomplish the same end.

In summary, the head restraint assembly 34 of the present invention provides an offset 64 that minimizes backset to reduce the likelihood of whiplash. The head restraint assembly 34 of the present invention further provides an offset post 46 to maintain a substantially constant backset while providing vertical adjustment relative to the seat back 12; especially where the locking mechanism 22 is located within the head restraint 34. The head restraint assembly 34 of the present invention further provides a contoured post 46 to increase the surface area of the cross member 52 within the bun 36 to reduce head displacement during a rear end vehicular collision. Finally, head restraint assembly 34 of the present invention minimizes backset and reduces head displacement and is cost-effective to manufacture, easy to install, and suitable for use within all vehicle models.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

What is claimed is:

1. A head restraint assembly for a vehicle seat assembly, said head restraint assembly comprising:

a post adapted to operatively engage a vehicle seat and provide vertical movement relative thereto, said post including a control leg, a slave leg and a contoured cross member disposed therebetween, each of said legs having a terminal end and an offset disposed between said terminal end and said contoured cross member, said control leg having a plurality of aligned notches disposed between said terminal end and said offset and in spaced relation relative to each other to define a predetermined number of vertical adjustment positions, said notches adapted to operatively engage a portion of the vehicle seat to facilitate free movement between the vertical adjustment positions in a direction away from the seat back and releasable locking movement between the vertical adjustment positions in a direction toward the seat back;

a bun operatively attached to said post such that said offsets advance a portion of said bun and a portion of said post toward a seat occupant to reduce head displacement during a rear end vehicular collision;

wherein said slave leg includes a plurality of aligned detents in spaced relation to each other to provide lateral support of said bun at each of the vertical adjustment positions and a plurality of bridges disposed between said detents, said bridges are adapted to join said detents and provide efficient movement therebetween during vertical adjustment by said control leg.

2. The head restraint assembly as set forth in claim 1 wherein said offsets are adapted to provide energy management during a vehicular collision and provide a substantially constant backset during vertical adjustment relative to a vehicle seat back.

3. The head restraint assembly as set forth in claim 1 wherein said cross member is substantially sinusoidally contoured to increase the surface area and strength of said post within said bun to reduce head displacement in the event of a rear end vehicular collision.

4. The head restraint assembly as set forth in claim 3 wherein said cross member is contoured to define said post as substantially "M" shaped.

5. The head restraint assembly as set forth in claim 1 wherein said bun includes a foam core that surrounds said cross member and a portion of said legs.

6. The head restraint assembly as set forth in claim 5 wherein said bun includes a coverstock adapted to conceal said foam core, said coverstock having a class-A surface visible from a vehicle interior and a class-B surface adapted to contact said foam core.

7. A vehicle seat having a head restraint assembly adapted to operatively engage the seat back of a vehicle seat, said vehicle seat comprising:
a lower seat assembly supported on a mounting assembly to operatively secure said lower seat assembly to a vehicle;
a seat back operatively supported by said lower seat assembly; and
a head restraint assembly including a post adapted to operatively engage said seat back and provide vertical movement relative thereto, said post including control leg, a slave leg and a contoured cross member disposed therebetween, each of said legs having a terminal end and an offset disposed between said terminal end and said contoured cross member and a bun operatively attached to said post such that said offsets advance a portion of said bun and a portion of said post toward a seat occupant to reduce head displacement during a rear end vehicular collision, said control leg having a plurality of aligned notches disposed between said terminal end and said offset and in spaced relation relative to each other to define a predetermined number of vertical adjustment positions, said notches adapted to operatively engage a portion of the vehicle seat to facilitate free movement between the vertical adjustment positions in a direction away from the seat back and releasable locking movement between the vertical adjustment positions in a direction toward the seat back, wherein said slave leg includes a plurality of aligned detents in spaced relation to each other to provide lateral support of said bun at each of the vertical adjustment positions and a plurality of bridges disposed between said detents, said bridges are adapted to join said detents and provide efficient movement therebetween during vertical adjustment by said control leg.

8. The head restraint assembly as set forth in claim 7 wherein said offsets are adapted to provide energy management during a vehicular collision and provide a substantially constant backset during vertical adjustment relative to a vehicle seat back.

9. The head restraint assembly as set forth in claim 7 wherein said cross member is substantially sinusoidally contoured to increase the surface area and strength of said post within said bun to reduce head displacement in the event of a rear end vehicular collision.

10. The head restraint assembly as set forth in claim 9 wherein said cross member is contoured to define said post as substantially "M" shaped.

11. The head restraint assembly as set forth in claim 7 wherein said bun includes a foam core that surrounds said cross member and a portion of said legs.

12. The head restraint assembly as set forth in claim 11 wherein said bun includes a coverstock adapted to conceal said foam core, said coverstock having a class-A surface visible from a vehicle interior and a class-B surface adapted to contact said foam core.

* * * * *